(No Model.) 2 Sheets—Sheet 1.

M. S. McCOY.
BAND CUTTER AND FEEDER FOR THRASHERS.

No. 461,036. Patented Oct. 13, 1891.

ATTEST  
Helen Graham.  
William Graham.

INVENTOR,  
M. S. McCoy.  
by his attorney  
L. P. Graham (No Model.) 2 Sheets—Sheet 2.
M. S. McCOY.
BAND CUTTER AND FEEDER FOR THRASHERS.
No. 461,036. Patented Oct. 13, 1891.
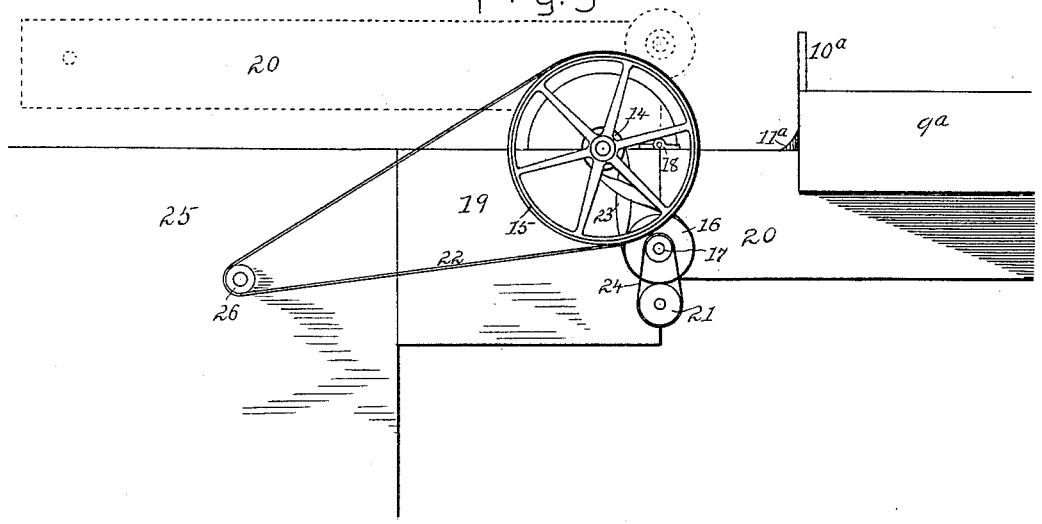
ATTEST
Helen Graham
William Graham
INVENTOR
M S McCoy
by his attorney
L. P. Graham

UNITED STATES PATENT OFFICE.

MELVIN S. McCOY, OF MONTICELLO, ILLINOIS.

BAND-CUTTER AND FEEDER FOR THRASHERS.

SPECIFICATION forming part of Letters Patent No. 461,036, dated October 13, 1891.

Application filed April 6, 1891. Serial No. 387,746. (No model.)

*To all whom it may concern:*

Be it known that I, MELVIN S. MCCOY, of Monticello, in the county of Piatt and State of Illinois, have invented certain new and useful Improvements in a Band-Cutter and Feeder for Thrashers, of which the following is a specification.

This invention is designed to cut the bands of bundles of grain, to spread the grain, and to deliver it continuously and uniformly to the cylinder of the thrasher. The result is accomplished by the mechanism hereinafter set forth and claimed.

Figure 1:
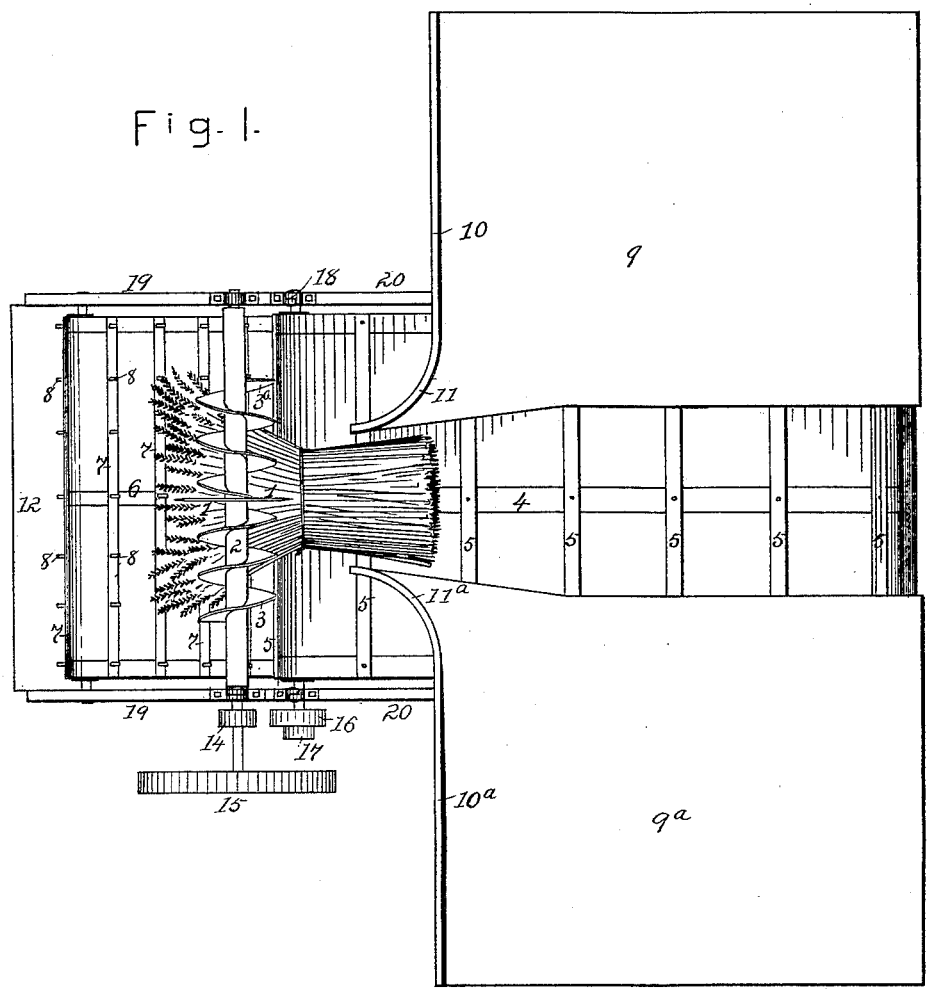
Figure 2:
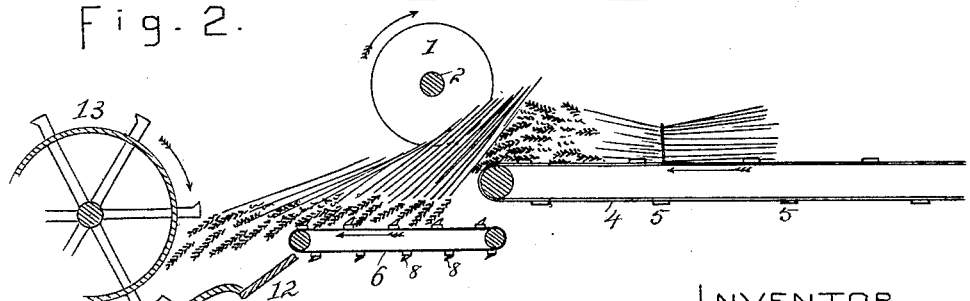

In the drawings accompanying and forming a part of this specification, Figure 1 is a plan of my band-cutter and feeder. Fig. 2 represents, in section, the operative parts of the machine and illustrates the manner in which the feed is made continuous and uniform. Fig. 3 is a side view of enough of the device to show the drive-gearing and illustrate the manner in which the feed-apron is folded back on the thrasher when not in use. Fig. 4 represents an inclined feed-table and grain-guide.

The shaft 2 extends across the feeder, has bearings therein, and is provided at its longitudinal center with the circular knife 1. This knife is preferably provided with a continuous cutting-edge; but it may be toothed in any desired manner. The reversed spirals 3 and 3ª are placed one on each side of knife 1, and their construction and arrangement with reference to the direction of their rotation are such as to tend to spread the grain from the center of the shaft outward. The apron 4 has cross-slats 5, and it acts as a carrier to convey the grain to the cutter and spreader. The apron 6 has cross-bars 7, which are preferably provided with rearwardly-inclined teeth 8. It is placed in front of and below the carrier 4 and under the cutter and spreader. Its speed is slower than that of carrier 4, and its feed is toward the thrasher-cylinder. The receiving-tables 9 and 9ª incline downward at their inner edges, and such inner edges converge at their inner ends. They have the guards 10 and 10ª, respectively, which curve forward at 11 and 11ª, and are cut circularly, as seen at 27 in Fig. 4. The board 12 (seen in Figs. 1 and 2) fills the space between apron 6 and the concave of the cylinder. The cylinder is shown at 13 in Fig. 2. Pulley 15 on shaft 2 is driven by belt 22, and such belt receives motion from pulley 26 on the shaft of the cylinder. Twisted belt 23 connects pulleys 14 and 16 and drives the apron 4. Belt 24 connects pulleys 17 and 21 and drives the apron 6. Part 19 is rigidly secured to thrasher 25, and part 20 is hinged at 18 to part 19.

Grain is supplied to tables 9 and 9ª and passes down the same to apron 4. As it is carried along the apron, it is arranged centrally by the converging edges of the tables and the scattered straws are collected by the curved guards. When the bundle reaches the spirals, it is immediately subjected to their spreading action, as seen in Fig. 1, and by the time the band reaches the knife it is under such tension as to be easily severed. After the band is cut the spreading operation is continued, the butts passing through the concaved ends 27 of the curved guard, if necessary. The grain falls obliquely onto apron 6, as shown in Fig. 2. The upper straws pass into immediate contact with the thrasher-cylinder, while the lower ones are retained for a brief interval by the teeth of the apron, and are supplied more or less gradually to the cylinder. As one bundle pitches over onto the retarding-apron, another bundle is presented under its inclined butts, as indicated, and the feed is thus made practically continuous.

In preparing the thrasher for the road the tables and belt 24 are removed, and frame 20 is folded over the top of the thrasher, as shown by dotted lines in Fig. 3.

I claim—

1. In band-cutters and feeders, the combination of primary apron 4, secondary apron 6 in front of and below apron 4 and having slower motion than apron 4, and a band-cutter and spreader journaled over said aprons and just beyond the delivery end of apron 4, whereby the band is cut and the grain spread both laterally and lengthwise of the bundle, as set forth.

2. In band-cutters and feeders, the combination of primary apron 4, secondary apron 6 in front of and below apron 4 and having slower motion than apron 4, and the shaft journaled over said aprons just beyond the delivery end of apron 4 and provided with the band-cutting disk and the spreading reversed spirals, as set forth.

In testimony whereof I sign my name in the presence of two subscribing witnesses.

MELVIN S. McCOY.

Attest:
L. B. TINDER,
OWEN HUDGEN.